(12) United States Patent
Pedersen et al.

(10) Patent No.: US 8,331,230 B2
(45) Date of Patent: Dec. 11, 2012

(54) APPARATUS, METHOD, AND COMPUTER PROGRAM PRODUCT PROVIDING THRESHOLD-BASED BUFFER STATE REPORTS FROM USER EQUIPMENT TO A WIRELESS NETWORK

(75) Inventors: Klaus I. Pedersen, Aalborg (DK); Claudio Rosa, Randers (DK); Preben E. Mogensen, Gistrup (DK)

(73) Assignee: Nokia Corporation, Espoo (FI)

( * ) Notice: Subject to any disclaimer, the term of this patent is extended or adjusted under 35 U.S.C. 154(b) by 1207 days.

(21) Appl. No.: 11/700,998

(22) Filed: Feb. 1, 2007

(65) Prior Publication Data

US 2007/0201369 A1    Aug. 30, 2007

Related U.S. Application Data

(60) Provisional application No. 60/765,082, filed on Feb. 3, 2006.

(51) Int. Cl.
*H04J 1/16* (2006.01)
(52) U.S. Cl. ......... 370/230; 370/236; 370/252; 370/468
(58) Field of Classification Search .................. 370/230, 370/395.4, 349, 236, 252, 468
See application file for complete search history.

(56) References Cited

U.S. PATENT DOCUMENTS

| | | | |
|---|---|---|---|
| 6,359,895 B1 * | 3/2002 | Yamanaka | 370/408 |
| 6,850,540 B1 * | 2/2005 | Peisa et al. | 370/468 |
| 6,993,342 B2 * | 1/2006 | Kuchibhotla et al. | 455/450 |
| 7,474,642 B1 * | 1/2009 | Chheda | 370/329 |
| 2002/0021698 A1 | 2/2002 | Lee et al. | 370/394 |
| 2002/0141454 A1 * | 10/2002 | Muniere | 370/535 |
| 2003/0156542 A1 * | 8/2003 | Connor | 370/236 |
| 2004/0218617 A1 * | 11/2004 | Sagfors | 370/412 |
| 2004/0224677 A1 | 11/2004 | Kuchibhotla et al. | 455/422.1 |
| 2005/0047416 A1 * | 3/2005 | Heo et al. | 370/395.4 |
| 2005/0220049 A1 * | 10/2005 | Zhang et al. | 370/329 |
| 2005/0259616 A1 * | 11/2005 | Major et al. | 370/329 |
| 2005/0259662 A1 * | 11/2005 | Kim et al. | 370/395.4 |
| 2006/0143444 A1 * | 6/2006 | Malkamaki et al. | 713/160 |
| 2006/0165045 A1 * | 7/2006 | Kim et al. | 370/349 |
| 2006/0171406 A1 * | 8/2006 | Kwon et al. | 370/419 |
| 2009/0034455 A1 * | 2/2009 | Lee et al. | 370/329 |

FOREIGN PATENT DOCUMENTS

| | | |
|---|---|---|
| CN | 1604685 A | 4/2005 |
| EP | 1509011 A2 | 8/2004 |
| EP | 1511245 A2 | 8/2004 |
| EP | 1513363 A1 | 9/2004 |
| EP | 1 599 063 A1 | 11/2005 |
| WO | WO 2005/104461 A1 | 11/2005 |

OTHER PUBLICATIONS

"Packet Scheduling for UTRAN LTE R2-060052", 3GPP TSG-RAN WG2 Meeting #50, Sophia Antipolis—France, Jan. 9-13, 2006, pp. 1-11.

(Continued)

*Primary Examiner* — Ricky Ngo
*Assistant Examiner* — Dewanda Samuel
(74) *Attorney, Agent, or Firm* — Harrington & Smith

(57) ABSTRACT

Methods, apparatus and computer program products are provided. A method includes: providing at least one logical channel flow, wherein each logical channel flow of the at least one logical channel flow has an associated traffic priority; grouping the at least one logical channel flow by the associated traffic priority to form at least one group; determining an aggregate data flow for at least one group; comparing the determined aggregate data flow with at least one threshold value to obtain an indication value; and transmitting the indication value from a user equipment to a base station.

37 Claims, 5 Drawing Sheets

OTHER PUBLICATIONS

"Technical Specification Group Radio Access Network; FDD Enhanced Uplink; Overall description; Stage 2 (Release 6)", 3GPP TS 25.309 v6.6.0 (2005), pp. 1-34.

"Buffer Reporting for E-UTRAN R2-060829", 3GPP TSG-RAN WG2 Meeting #52, Athens, Greece, Mar. 27-31, 2006, 5 pgs.

3GPP TR 25.896 V6.0.0 (Mar. 2004), Technical Report, $3^{rd}$ Generation Partnership Project; Technical Specification Group Radio Access Network; Feasibility Study for Enhanced Uplink for UTRA FDD, (Release 6), (26 pages).

* cited by examiner

| | PARAMETER | DEFAULT VALUE |
|---|---|---|
| SIGNALING | $T_{11}$ | MINIMUM SIZE OF AN RRC MESSAGE |
| | $T_{12}$ | 2 * MINIMUM SIZE OF AN RRC MESSAGE |
| | $T_{13}$ | 5 * MINIMUM SIZE OF AN RRC MESSAGE |
| DELAY SENSITIVE RT | $T_{21}$ | EMPTY BUFFER |
| | $T_{22}$ | 2 * SIZE OF A VoIP PACKET |
| | $T_{23}$ | 3 * SIZE OF A VoIP PACKET |

EXAMPLE OF DEFAULT THRESHOLD VALUES FOR THE SIGNALING AND DELAY SENSITIVE RT TRAFFIC (SEE FIGURE 2)

FIG.3

APPARATUS, METHOD, AND COMPUTER PROGRAM PRODUCT PROVIDING THRESHOLD-BASED BUFFER STATE REPORTS FROM USER EQUIPMENT TO A WIRELESS NETWORK

CROSS-REFERENCE TO RELATED APPLICATIONS

This patent application claims priority under 35 U.S.C. §119(e) from Provisional Patent Application No.: 60/765,082, filed Feb. 3, 2006, the disclosure of which is incorporated by reference herein in its entirety.

TECHNICAL FIELD

The exemplary embodiments of this invention relate generally to wireless communications systems and devices and, more specifically, relate to packet mode transmissions of data between a wireless network and a user equipment (UE), such as a cellular phone.

BACKGROUND

The following abbreviations are herewith defined:
3GPP third generation partnership project
FDMA frequency division multiple access
HSUPA high speed uplink packet access
IEEE institute of electrical and electronics engineers
IP internet protocol
L2 layer 2 (medium access control, MAC)
LCID logical channel identifier
LTE long term evolution
MAC medium access control (layer 2, L2)
Node B base station
NRT non-real time
PDU protocol data unit
PHY physical layer (layer 1, L1)
PS packet scheduler
QoS quality of service
RLL radio link layer
RLSP radio link service profile
RNL radio network layer
RRC radio resource control
RT real time
UE user equipment
UL uplink (UE to Node B)
UMTS universal mobile telecommunication system
UTRAN UMTS terrestrial radio access network
VoIP voice over internet protocol
WiMAX worldwide interoperability for microwave access (IEEE 802.16 standard)

An aspect of the long term evolution (LTE) of UTRAN, which may at times be referred to as 3.9G, relates to UE buffer reporting schemes to support uplink (UL) packet scheduling, that is, the process of allocating radio resources for the transmission of data from the UE to the Node-B.

In the UL, a cell specific PS does not have immediate access to the transmission buffers. However, without a priori knowledge of the data available for transmission in the UE buffers, the uplink Node-B PS can only schedule users blindly (or based on the level of utilization of the previously allocated resources). This is clearly not an optimal solution, as it can be wasteful of system bandwidth and other finite resources.

It can be noted that a priori knowledge of the data available for transmission in the UE buffers is particularly important with orthogonal multiple access technologies such as single carrier FDMA, which has already been specified for use in 3GPP for the UTRAN LTE uplink.

Different buffer reporting schemes to support fast uplink packet scheduling have been defined in previous communication standards such as IEEE 802.16 (WiMax) and the UMTS uplink evolution (HSUPA).

In WiMax, a variety of buffer reporting schemes have been standardized, each one optimized for a particular data application. The buffer reporting schemes defined for HSUPA include the so-called happy bit, and the reporting of more specific buffer information (scheduling information). However, neither of these approaches is optimally suited for use in UTRAN LTE to enable efficient QoS-aware packet scheduling, while also providing reduced signaling overhead.

SUMMARY

In an exemplary aspect of the invention, a method is provided. The method includes: providing at least one logical channel flow, wherein each logical channel flow of the at least one logical channel flow has an associated traffic priority; grouping the at least one logical channel flow by the associated traffic priority to form at least one group; determining an aggregate data flow for at least one group; comparing the determined aggregate data flow with at least one threshold value to obtain an indication value; and transmitting the indication value from a user equipment to a base station.

In another exemplary aspect of the invention, a computer program product is provided. The computer program product includes program instructions embodied on a tangible computer-readable medium. Execution of the program instructions results in operations including: providing at least one logical channel flow, wherein each logical channel flow of the at least one logical channel flow has an associated traffic priority; grouping the at least one logical channel flow by the associated traffic priority to form at least one group; determining an aggregate data flow for at least one group; comparing the determined aggregate data flow with at least one threshold value to obtain an indication value; and transmitting the indication value from a user equipment to a base station.

In a further exemplary aspect of the invention, a device is provided. The device includes: a data processor configured to group at least one logical channel flow into at least one group, wherein each logical channel flow of the at least one logical channel flow has an associated traffic priority, wherein the at least one logical channel flow is grouped by the data processor according to the associated traffic priority, wherein the data processor is further configured to determine an aggregate data flow for at least one group; at least one uplink buffer coupled to the data processor, wherein the at least one uplink buffer is configured to store the determined aggregate data flow; a comparator coupled to the at least one uplink buffer, wherein the comparator is configured to compare the aggregate data flow with at least one threshold value to obtain an indication value; and a transmitter configured to transmit the indication value from a user equipment to a base station.

In another exemplary aspect of the invention, a method is provided. The method includes: receiving an indication value from a user equipment, wherein the received indication value is obtained from a comparison of an aggregate data flow with at least one threshold value; and using the received indication value to schedule a downlink flow for the user equipment.

In a further exemplary aspect of the invention, a threshold-based state report is provided. The threshold-based state report is embodied on a tangible medium and includes: at least one bit corresponding to an indication value, wherein the indication value includes a comparison of an aggregate data flow with at least one threshold value, wherein the aggregate data flow includes a sum of data flows of at least one logical channel flow, wherein each logical channel flow of the at least one logical channel flow has an associated traffic priority, wherein the sum of data flows includes a sum of data flows having a same associated traffic priority, wherein the threshold-based state report is configured to be transmitted over a wireless connection within a network.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 3 shows a Table containing an example of default threshold values for signaling and delay sensitive RT traffic, as per the example shown in FIG. 2;

DETAILED DESCRIPTION

Disclosed herein is a UE buffer reporting procedure specifically optimized for UTRAN LTE to enable efficient QoS-aware packet scheduling, while providing reduced signaling overhead. However, it should be realized that the exemplary embodiments of the invention can be used as well with other types of wireless communication systems.

Figure 1:
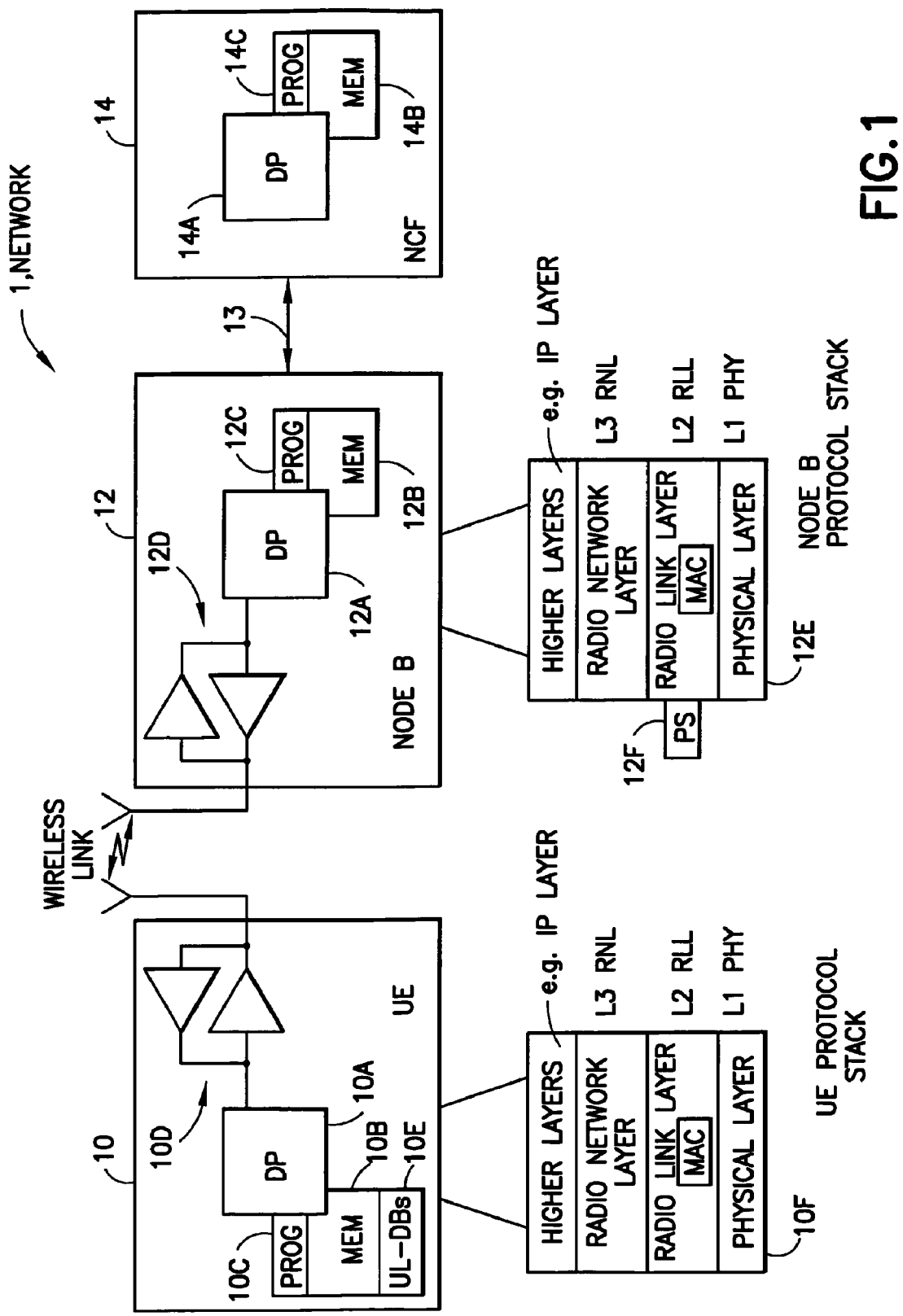
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 is adapted for communication with a UE 10 via a Node B (base station) 12. The network 1 may include at least one network control function (NCF) 14. The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the NCF 14 that also includes a DP 14A and a MEM 14B storing an associated PROG 14C. At least one of the PROGs 10C, 12C and 14C is assumed to include program instructions that, when executed by the associated DP, enable the electronic device to operate in accordance with the exemplary embodiments of this invention, as will be discussed below in greater detail.

The MEM 10B of the UE 10 is also assumed for the purposes of this invention to include UL data buffers (UL-DBs) 10E. The UE 10 is assumed to include and implement a protocol stack 10F containing at least layers L1 (PHY), L2 (RLL) and L3 (RNL), and typically higher layers as well (e.g., an IP layer). Note that the UL DBs 10E may actually be associated with a MAC layer L2 of the UE protocol stack 10F.

The Node B 12 is assumed to include and implement a protocol stack 12E also containing at least layers L1 (PHY), L2 (RLL) and L3 (RNL), and typically also the higher layers as well (e.g., an IP layer). The L2 (MAC layer) of the Node B 12 includes the functionality of a PS 12F.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the DP 10A of the UE 10 and the DP 12A of the Node B, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

In accordance with exemplary embodiments of this invention, at Layer-2 (Radio Link Layer, containing the MAC functionality) in the UE 10, each logical channel flow is characterized by an identifier (LCID) and by a set of QoS parameters defined via a Radio Link Service Profile (RLSP). One of the QoS parameters in the RLSP is the traffic priority. The traffic priority may be: signaling, delay sensitive RT, delay tolerant RT, and NRT (or best effort).

Figure 2:
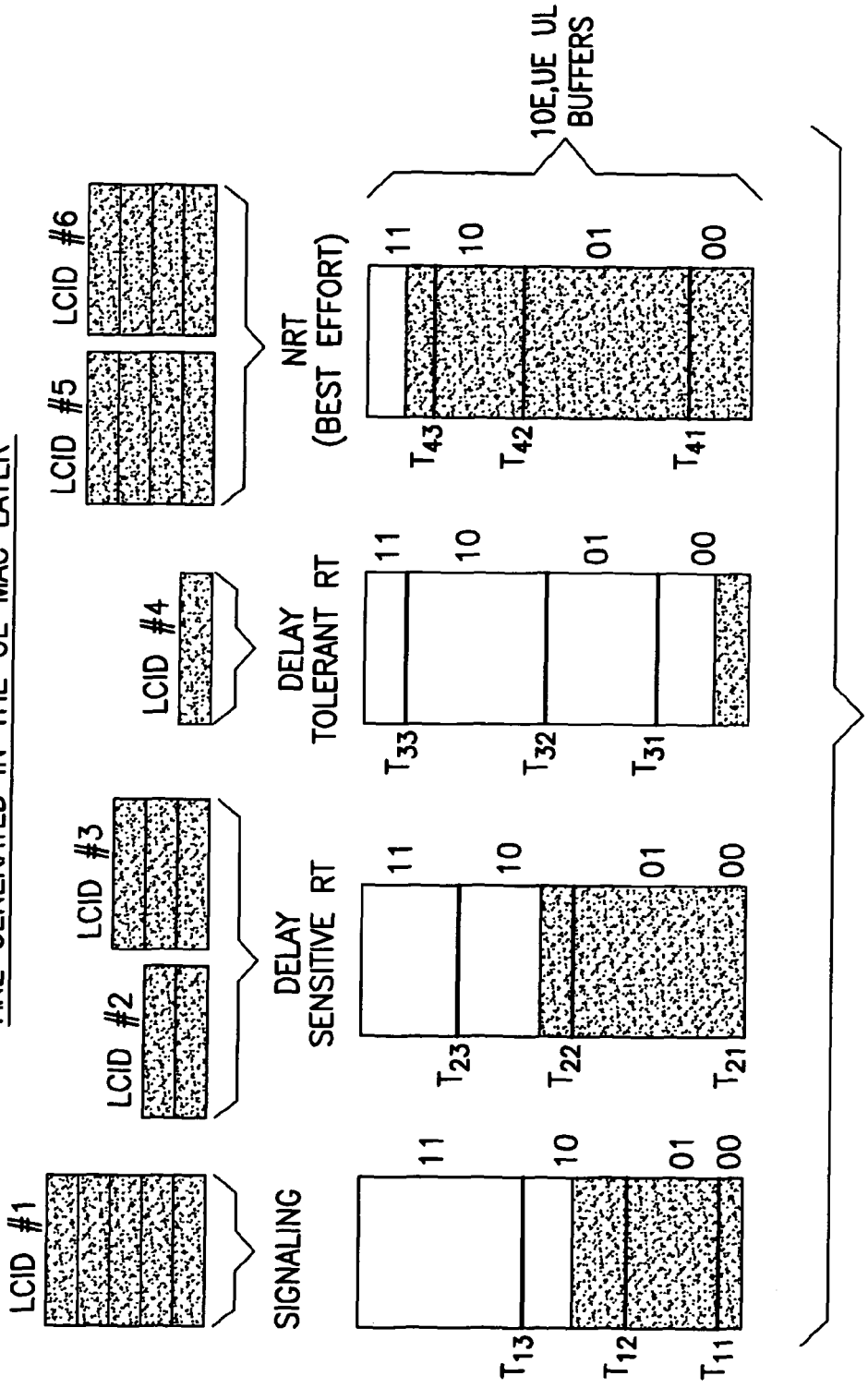
FIG. 2 is an example of how threshold-based buffer state reports are generated in a UE MAC layer.

In accordance with exemplary embodiments of this invention, a reporting scheme for the UE UL buffers 10E is based on the concept of aggregate data flow, as illustrated in FIG. 2. The state of a specific aggregate data flow can be obtained by summing the amount of data from the logical channel flows with equal traffic priority. A threshold-based buffer state report may use a predefined number of bits and predefined threshold (T) values for each aggregate data flow to signal to the Node-B PS 12F the state of the UE buffers 10E with respect to the different traffic priorities. The example shown in FIG. 2 uses two bits for each aggregate data flow, though different numbers of bits and representations may be employed.

In FIG. 2, four aggregate data flows are obtained, one each for four service classes: signaling, delay sensitive RT, delay tolerant RT and NRT (best effort). It is assumed that the four service classes correspond to four relative measures of traffic priority, listed above from highest priority to lowest. In the example of FIG. 2, the aggregate data flows are obtained by summing one or more logical channel flows (e.g., LCIDs) having equal traffic priority (i.e., the same service class). The aggregate data flow for each service class (i.e., each buffer) is compared against one or more threshold values. The FIG. 2 UL buffers utilize three threshold values to define four regions in which the aggregate data flow may fall, with each region identifiable by a two bit value. The regions correspond to the amount of the aggregate data flow. Thus, the two bit value indicates the aggregate data flow in the buffer. For example, the aggregate data flow of the signaling service class UL buffer shown in FIG. 2 is signaled by the two bit value 10. As a further example, the aggregate data flows shown in FIG. 2 may cumulatively be signaled as the 8-bit value: 10 10 00 11.

In other embodiments, a different number of aggregate data flows may be used. In further embodiments, the aggregate data flow may be obtained using a different process, a different measurement or a different characteristic of the logical channel flows. In other embodiments, a greater or lesser number of threshold values may be used. In further embodiments, different threshold values from those shown in FIG. 2 may be utilized. In other embodiments, the aggregate data flow may be signaled using a different number of bits.

Threshold-based reports reduce the signaling overhead since they avoid explicit signaling of the LCID over the air interface, while still enabling QoS differentiation. For example, the UE buffers 10E reporting technique in accordance with the exemplary embodiments of this invention allows the Node-B PS 12F to prioritize a first user having a small amount of delay sensitive RT data over a second user with a larger amount of NRT data.

The number of aggregate data flows and the number of thresholds used for each aggregate data flow may be the subject of standardization. In accordance with the UE buffers 10E reporting technique it is possible to define default values for the thresholds used to determine the state of the UE buffers 10E. An example of default threshold value for the signaling and delay sensitive RT traffic priorities, in a case where the UE 10 has both RRC data and VoIP packet data to transmit, is given in the Table shown in FIG. 3. Further in accordance with the exemplary embodiments of this invention the Node-B PS 12F may be provided with the flexibility to reconfigure these default values via RRC signaling to the UE 10.

The threshold-based reports in accordance with the exemplary embodiments of this invention can be transmitted periodically, or they may be transmitted based on an occurrence of one or more trigger events or conditions. The reporting mode (periodic or event-triggered) may be set by the Node-B PS via RRC signaling. For example, a change in the state of the UE buffers 10E (e.g., from 10 10 00 11 to 01 10 00 11 in FIG. 2) may represent a trigger for the transmission of a threshold-based report. Other reporting criteria for the transmission of threshold-based reports may include, but are not limited to: a) a minimum time that must elapse between two consecutive reports; and/or b) one or several time-to-trigger parameters. In regard to the latter criterion, a change in the state of the UE buffers 10E must be effective for a time period longer than the corresponding time-to-trigger parameter before the threshold-based report is actually transmitted. This provides hysteresis, and inhibits excessive UL signaling if a particular buffer fluctuates above and below a particular threshold (T). In general, these and other criteria may be introduced to limit the signaling overhead.

Figure 4:
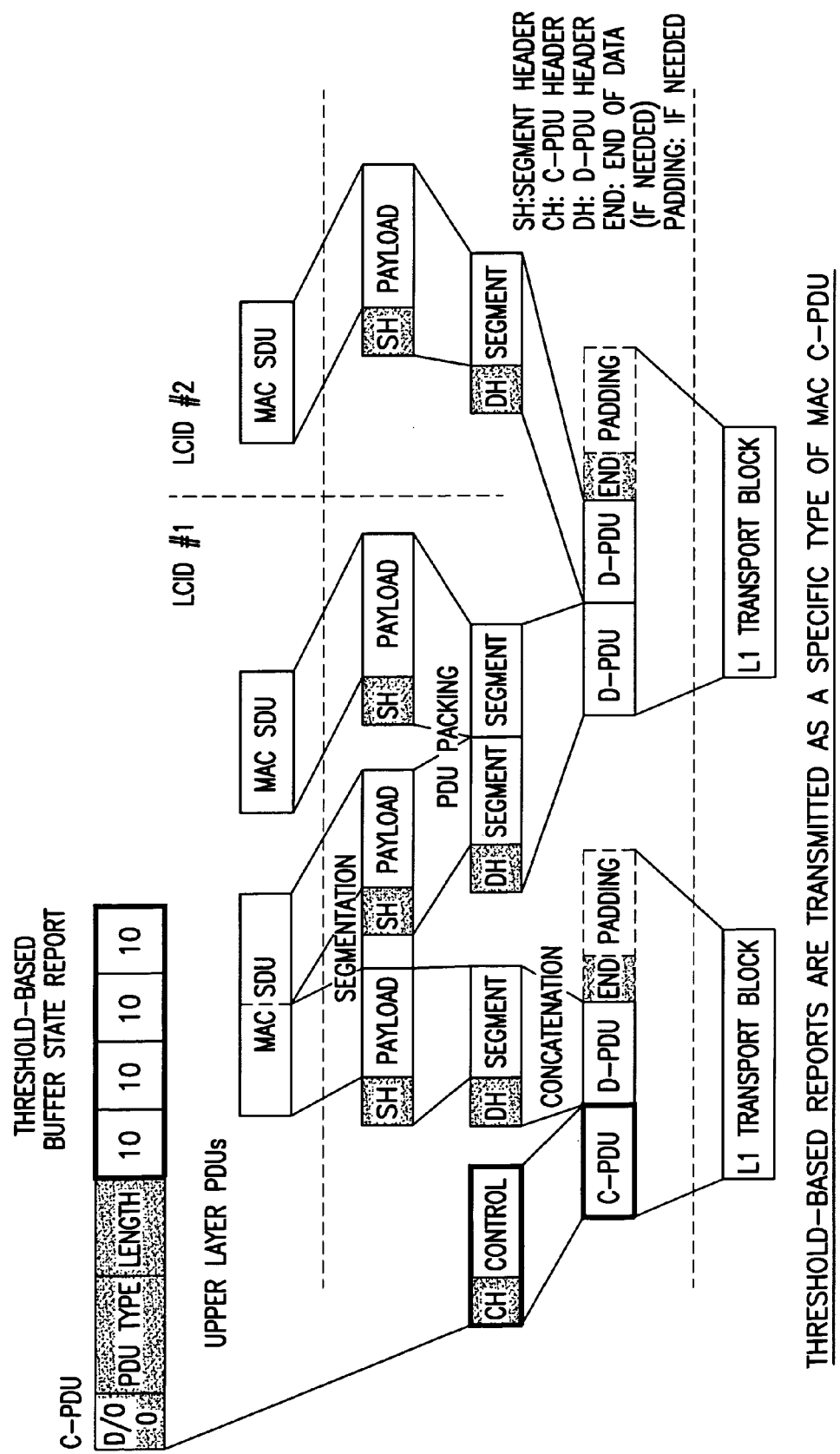
FIG. 4 is an example of UE buffer threshold-based reports transmitted as a specific type of MAC C-PDU.

The threshold-based UE buffer 10E state reports are transmitted preferably over the air interface using Layer-2 signaling. In practice, as illustrated in FIG. 4, the threshold-based reports are transmitted as a specific type of MAC Control (C-) PDU. The use of Layer-2 signaling is preferred in that both the UE transmission buffers 10E and the Node-B PS 12F are located in the MAC Layer (L2). With the use of MAC C-PDUs the exchange of the buffer state information between the UE 10 and the Node-B 12 is efficiently encapsulated at Layer-2.

Note that this MAC-C PDU signaling employs segment headers (SH), C-PDU headers (CH), D-PDU headers (DH), End of Data indicators (End), if needed, and padding bits, if needed. The end result is the formation of L1 (PHY) transport blocks for transmission over the air interface from the UE 10 to the Node B 12. The received MAC-C PDUs are interpreted in the MAC layer (L-2) of the Node B 12 in accordance with conventional practice, and the UE UL Buffers report information is extracted and provided to the PS 12F for interpretation and use in intelligently assigning resources to, and scheduling packet flows with, various UEs 10.

The UE buffers 10E threshold-based reports are particularly suitable for bursty traffic profiles, and are also particularly useful for the case where the UE 10 has several logical channel flows simultaneously active. However, even when frequent signaling of buffer state information is not necessary, the flexibility provided by the buffer reporting scheme in accordance with exemplary embodiments of this invention still permits the reduction in the signaling overhead between the UE 10 and the Node B 12. Further, using the MAC C-PDUs to transmit the threshold-based reports can beneficially minimize the signaling delays between the UE 10 and the Node-B 12, as conventionally neither the UE 10 or the Node B exchanges buffer state information between MAC and other protocol layers. The use of the UE buffers 10E threshold-based reports thus enables and facilitates fast packet scheduling operations.

While the UE buffers 10E threshold-based reports are preferably primarily implemented at Layer-2, it should be noted that there may also be at least Layer-3 involvement for setting the UE 10 reporting criteria at the Node B 12 and at the UE 10.

A number of advantages are made possible by the use of the exemplary embodiments of this invention that employ threshold-based buffer state reports embodied in, by example, MAC C-PDUs. These include, but need not be limited to, flexibility (adaptability to different types of data applications), support of QoS differentiation, reduced signaling overhead, and support for achieving fast packet data scheduling operations.

As can be appreciated, further additional advantages are realized by classifying logical channels into service classes, such as four service classes (signaling, delay sensitive RT, delay tolerant RT, best effort), as an explicit indication of the logical channel ID (or priority queue ID) is not required. Further, by defining and using different data amount thresholds for the different service classes, an explicit indication of the actual data amount for each service class is not required.

Figure 5:
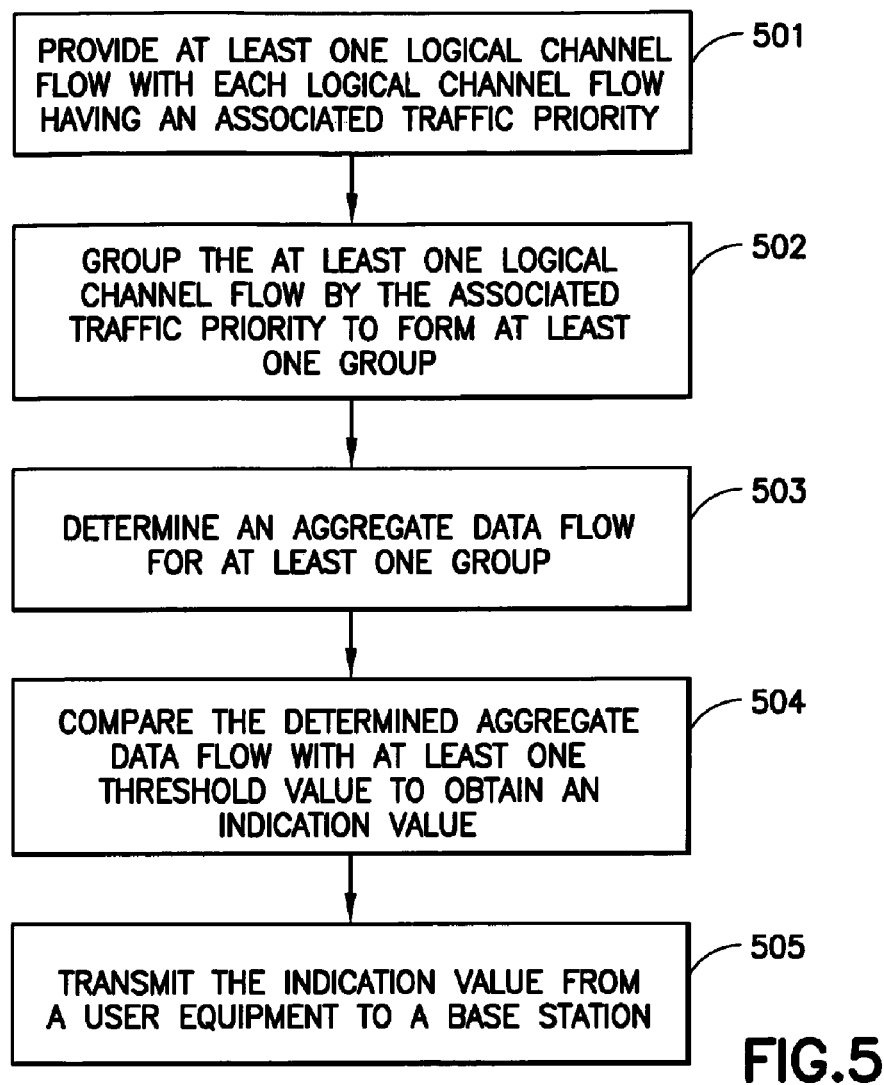
FIG. 5 depicts a flowchart illustrating one non-limiting example of a method for practicing the exemplary embodiments of this invention.

FIG. 5 depicts a flowchart illustrating one non-limiting example of a method for practicing the exemplary embodiments of this invention. The method includes: providing at least one logical channel flow, wherein each logical channel flow of the at least one logical channel flow has an associated traffic priority (box 501); grouping the at least one logical channel flow by the associated traffic priority to form at least one group (box 502); determining an aggregate data flow for at least one group (box 503); comparing the determined aggregate data flow with at least one threshold value to obtain an indication value (box 504); and transmitting the indication value from a user equipment to a base station (box 505).

In other embodiments, determining the aggregate data flow comprises summing an amount of data. In further embodiments, summing comprises using an uplink buffer. In other embodiments, the at least one threshold value is predefined. In further embodiments, the indication value comprises a predefined number of bits. In other embodiments, the indication value is transmitted using layer 2 signaling. In further embodiments, the layer 2 signaling comprises using a medium access control control protocol data unit. In other embodiments, the indication value is transmitted periodically. In further embodiments, the indication value is transmitted in response to at least one condition being met or at least one triggering event. In other embodiments, the at least one condition comprises the indication value changing. In further embodiments, the at least one condition comprises a minimum time between two consecutive transmissions of the indication value. In other embodiments, the at least one condition comprises at least one time-to-trigger parameter. In further embodiments, the at least one group comprises a plurality of service classes. In other embodiments, the plurality of service classes comprises a signaling class, a delay sensitive real time class, a delay tolerant real time class and a best effort class. In further embodiments, the user equipment and the base station comprise nodes in a long term evolution UMTS terrestrial radio access network system.

In other embodiments, the at least one group comprises a plurality of groups, wherein an aggregate data flow is determined for each group of the plurality of groups, wherein the determined aggregate data flows collectively comprise a plurality of aggregate data flows. In further embodiments, the step of comparing the determined aggregate data flow with at least one threshold value to obtain an indication value comprises comparing each aggregate data flow of the plurality of aggregate data flows with at least one threshold value to obtain a plurality of indication values. In other embodiments, the step of transmitting the indication value comprises transmitting the plurality of indication values.

Figure 6:
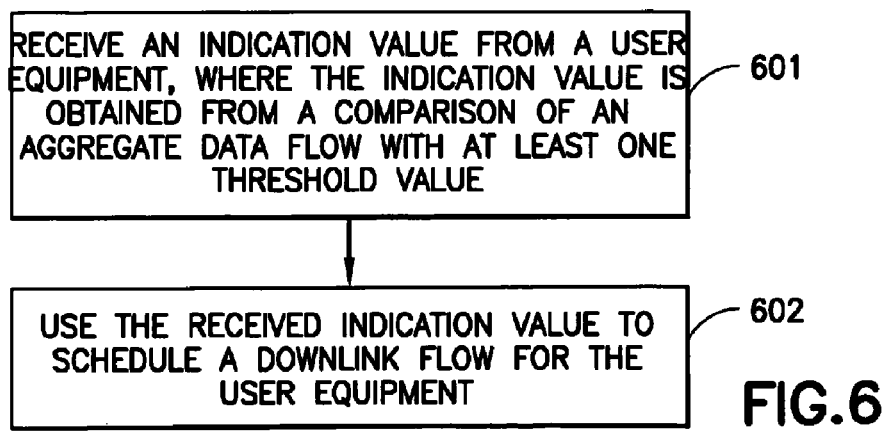
FIG. 6 depicts a flowchart illustrating another non-limiting example of a method for practicing the exemplary embodiments of this invention.

FIG. 6 depicts a flowchart illustrating another non-limiting example of a method for practicing the exemplary embodiments of this invention. The method includes: receiving an indication value from a user equipment, wherein the received indication value is obtained from a comparison of an aggregate data flow with at least one threshold value (box 601); and using the received indication value to schedule a downlink flow for the user equipment (box 602).

In other embodiments, the exemplary method shown in FIG. 6 may comprise one or more additional aspects of the exemplary embodiments of the invention as discussed above with respect to the exemplary method of FIG. 5 and as further discussed herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

Based on the foregoing it should be apparent that the exemplary embodiments of this invention provide a method, apparatus and computer program product(s) to provide threshold-based indications of the state of a plurality of UE UL data buffers to the Node B, and the interpretation of the threshold-based indications at the Node B, such as at the Node B PS 12F, for use in making at least resource scheduling decisions.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

As was noted above, while the exemplary embodiments have been described above in the context of a UTRAN-LTE system, it should be appreciated that the exemplary embodiments of this invention are not limited for use with only this one particular type of wireless communication system, and that they may be used to advantage in other wireless communication systems.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

What is claimed is:

1. A method comprising:

for each group in a plurality of groups, determining, by a mobile device, an aggregate data flow for the group, where the each group in the plurality of groups comprises at least one logical channel flow, wherein determining the aggregate data flow comprises summing an amount of data in data flows of each of the at least one logical channel flow;

for the each group in the plurality of groups, comparing, by the mobile device, the determined aggregate data flow of the group with at least one threshold value to obtain an indication value, wherein comparing the each group in the plurality of groups obtains a plurality of indication values; and generating, by the mobile device, a signal comprising the plurality of indication values, where the generated signal is for transmission from the mobile device to a base station and where the signal comprises at least two indication value fields, and where each indication value field in the at least two indication value fields comprises at least one bit corresponding to an indication value of the plurality of indication values.

2. The method of claim 1, wherein summing comprises using an uplink buffer.

3. The method of claim 1, wherein the at least one threshold value is predefined.

4. The method of claim 1, wherein each indication value comprises a predefined number of bits.

5. The method of claim 1, further comprising: transmitting the generated signal.

6. The method of claim 1, wherein the plurality of groups comprises a plurality of service classes.

7. The method of claim 6, wherein the plurality of service classes comprises a signaling class, a delay sensitive real time class, a delay tolerant real time class and a best effort class.

8. The method of claim 1, wherein the mobile device and the base station comprise nodes in a long term evolution universal mobile telecommunication system terrestrial radio access network system.

9. The method of claim 1, wherein the each group in the plurality of groups is comprised of at least one logical channel flow grouped by an associated traffic priority of the at least one logical channel flow.

10. The method of claim 1, further comprising: transmitting the generated signal from the mobile device to the base station.

11. The method of claim 10, wherein the generated signal is transmitted using layer 2 signaling.

12. The method of claim 11, wherein the layer 2 signaling comprises using a medium access control control protocol data unit.

13. The method of claim 10, wherein the generated signal is transmitted periodically.

14. The method of claim 10, wherein the generated signal is transmitted in response to at least one condition being met or at least one triggering event.

15. The method of claim 14, wherein the at least one condition comprises the indication value changing.

16. The method of claim 14, wherein the at least one condition comprises a minimum time between two consecutive transmissions of the generated signal.

17. The method of claim 14, wherein the at least one condition comprises at least one time-to-trigger parameter.

18. The method of claim 1, where the at least one logical channel flow of the each group in the plurality of groups is for at least one corresponding logical channel having a logical channel identifier and where the generated signal does not comprise the logical channel identifiers for the at least one corresponding logical channel.

19. A non-transitory computer-readable medium tangibly embodying program instructions, execution of the program instructions by a mobile device resulting in operations comprising:
for each group in a plurality of groups, determining an aggregate data flow of the group, where the each group in the plurality of groups comprises at least one logical channel flow, wherein determining the aggregate data flow comprises summing an amount of data in data flows of each of the at least one logical channel flow;
for the each group in the plurality of groups, comparing the determined aggregate data flow of the group with at least one threshold value to obtain an indication value, wherein comparing the each group in the plurality of groups obtains a plurality of indication values; and
generating a signal comprising the plurality of indication values, where the generated signal is for transmission from the mobile device to a base station, where the signal comprises at least two indication value fields, and where each indication value field in the at least two indication value fields comprises at least one bit corresponding to an indication value of the plurality of indication values.

20. The computer-readable medium of claim 19, wherein the plurality of groups comprises a plurality of service classes.

21. The computer-readable medium of claim 19, wherein the mobile device and the base station comprise nodes in a long term evolution universal mobile telecommunication system terrestrial radio access network system.

22. The computer-readable medium of claim 19, wherein the each group in the plurality of groups is comprised of at least one logical channel flow grouped by an associated traffic priority of the at least one logical channel flow.

23. The computer-readable medium of claim 19, the operations further comprising: transmitting the generated signal from the mobile device to the base station.

24. The computer-readable medium of claim 23, wherein the generated signal is transmitted using layer 2 signaling.

25. The computer-readable medium of claim 23, wherein the generated signal is transmitted in response to at least one condition being met or at least one triggering event.

26. A mobile device comprising:
a data processor configured to, for each group in a plurality of groups, determine an aggregate data flow for the group, where the each group in the plurality of groups comprises at least one logical channel flow, wherein determining the aggregate data flow comprises summing an amount of data in data flows of each of the at least one logical channel flow;
at least one uplink buffer configured to store a plurality of determined aggregate data flows;
a comparator configured to, for the each group in the plurality of groups, compare the aggregate data flow of the group with at least one threshold value to obtain an indication value, wherein comparing the each group in the plurality of groups obtains a plurality of indication values; and
a signal generator configured to generate a signal comprising the plurality of indication values, where the generated signal is for transmission from the mobile device to a base station, where the signal comprises at least two indication value fields, and where each indication value field in the at least two indication value fields comprises at least one bit corresponding to an indication value of the plurality of indication values.

27. The mobile device of claim 26, wherein the mobile device and the base station comprise nodes in a long term evolution universal mobile telecommunication system terrestrial radio access network system.

28. The mobile device of claim 26, wherein the data processor comprises the comparator.

29. The mobile device of claim 26, wherein the each group in the plurality of groups is comprised of at least one logical channel flow grouped by an associated traffic priority of the at least one logical channel flow.

30. The mobile device of claim 26, further comprising: a transmitter configured to transmit the generated signal from the mobile device to the base station.

31. The mobile device of claim 30, wherein the generated signal is transmitted by the transmitter using layer 2 signaling.

32. The mobile device of claim 31, wherein the layer 2 signaling comprises using a medium access control control packet data unit.

33. A method comprising:
receiving, by a base station, a signal from a user equipment, wherein the received signal comprises a plurality of indication values where each indication value is obtained from a comparison of an aggregate data flow with at least one threshold value, where each aggregate data flow is for a group in a plurality of groups, where each group in the plurality of groups comprises at least one logical channel flow, where the signal comprises at least two indication value fields, and where each indication value field in the at least two indication value fields comprises at least one bit corresponding to an indication value of the plurality of indication values; and
using, by the base station, the plurality of indication values to schedule a data flow for the user equipment.

34. The method of claim 33, wherein the signal is received from layer 2 signaling.

35. The method of claim 33, wherein the each indication value comprises a predefined number of bits.

36. A non-transitory computer-readable medium tangibly embodying a threshold-based state report comprising:
at least two indication value fields, where each indication value field in the at least two indication value fields comprises at least one bit corresponding to an indication value, wherein the indication value of the indication value field is obtained from a comparison of an aggregate data flow in a plurality of aggregate data flows with at least one threshold value,
wherein the aggregate data flow comprises a sum of data flows of at least one logical channel flow,
wherein the threshold-based state report is configured to be transmitted from a user equipment to a base station over a wireless connection within a network.

37. The computer-readable medium of claim 36, wherein the network comprises a long term evolution universal mobile telecommunication system terrestrial radio access network.

* * * * *